(12) United States Patent
Adachi

(10) Patent No.: US 11,501,577 B2
(45) Date of Patent: Nov. 15, 2022

(54) INFORMATION PROCESSING APPARATUS, INFORMATION PROCESSING METHOD, AND STORAGE MEDIUM FOR DETERMINING A CONTACT BETWEEN OBJECTS

(71) Applicant: CANON KABUSHIKI KAISHA, Tokyo (JP)

(72) Inventor: Daichi Adachi, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 160 days.

(21) Appl. No.: 16/896,491

(22) Filed: Jun. 9, 2020

(65) Prior Publication Data

US 2020/0394394 A1 Dec. 17, 2020

(30) Foreign Application Priority Data

Jun. 13, 2019 (JP) .............................. JP2019-110204

(51) Int. Cl.
| | |
|---|---|
| *G06V 40/20* | (2022.01) |
| *G06K 9/62* | (2022.01) |
| *H04N 13/111* | (2018.01) |
| *G06V 20/64* | (2022.01) |

(52) U.S. Cl.
CPC ........... *G06V 40/25* (2022.01); *G06K 9/6256* (2013.01); *G06V 20/64* (2022.01); *H04N 13/111* (2018.05)

(58) Field of Classification Search
None
See application file for complete search history.

(56) References Cited

U.S. PATENT DOCUMENTS

| | | | | |
|---|---|---|---|---|
| 6,072,504 A | * | 6/2000 | Segen ..................... | G06T 17/00 345/474 |
| 6,080,063 A | * | 6/2000 | Khosla .................... | A63F 13/65 463/42 |
| 7,403,202 B1 | * | 7/2008 | Nash ....................... | G06T 7/246 345/474 |
| 8,284,238 B2 | * | 10/2012 | Stone ..................... | G06T 15/20 348/700 |

(Continued)

FOREIGN PATENT DOCUMENTS

JP 2017212592 A 11/2017

*Primary Examiner* — Jason A Pringle-Parker
(74) *Attorney, Agent, or Firm* — Rossi, Kimms & McDowell LLP

(57) ABSTRACT

An information processing apparatus includes: a first obtaining unit configured to obtain a first three-dimensional model expressing a position and a shape of a first object in a three-dimensional space based on images of the first object captured by a plurality of image-capturing devices at different locations; a second obtaining unit configured to obtain a second three-dimensional model expressing a position and a shape of a second object in the three-dimensional space; an identifying unit configured to identify a plurality of parts of the first object; a determining unit configured to determine a contact between a certain part of the first object and the second object based on the obtained first three-dimensional model and second three-dimensional model and an identification result of the plurality of parts; and an output unit configured to output information according to a determination result of the contact.

16 Claims, 16 Drawing Sheets

(56) References Cited

U.S. PATENT DOCUMENTS

| | | | | |
|---|---|---|---|---|
| 8,648,857 | B2* | 2/2014 | Williams | G06T 11/00 |
| | | | | 345/632 |
| 9,089,742 | B2* | 7/2015 | Vilar | A63B 47/021 |
| 2005/0130725 | A1* | 6/2005 | Creamer | A63F 13/12 |
| | | | | 463/1 |
| 2008/0312010 | A1* | 12/2008 | Marty | G06T 7/285 |
| | | | | 73/865.4 |
| 2009/0129630 | A1* | 5/2009 | Gloudemans | G06T 15/20 |
| | | | | 382/103 |
| 2009/0220124 | A1* | 9/2009 | Siegel | G06T 7/292 |
| | | | | 382/103 |
| 2010/0171805 | A1* | 7/2010 | Ron | G06F 3/0482 |
| | | | | 348/14.02 |
| 2010/0259539 | A1* | 10/2010 | Papanikolopoulos | |
| | | | | G06V 40/20 |
| | | | | 348/E13.074 |
| 2012/0159290 | A1* | 6/2012 | Pulsipher | G06K 9/6262 |
| | | | | 714/E11.024 |
| 2014/0180451 | A1* | 6/2014 | Marty | A63B 15/00 |
| | | | | 700/91 |
| 2015/0206335 | A1* | 7/2015 | Hugel | A63F 13/25 |
| | | | | 345/419 |
| 2015/0317801 | A1* | 11/2015 | Bentley | G08B 21/043 |
| | | | | 382/107 |
| 2020/0380753 | A1* | 12/2020 | Adachi | G06T 17/00 |

* cited by examiner

IMAGE CAPTURED BY CAMERA 110a        IMAGE CAPTURED BY CAMERA 110k

| TIME POINT/MODEL ID | O1 | 02-01 | 02-02 | ... | 03-01 | 03-02 | ... |
|---|---|---|---|---|---|---|---|
| ... | | | | | | | |
| 6:32:05.32 | (-39.3, 8.3, 0), (-36.2, 12.3, 0) | (-39.3, 8.3, 0) | - | ... | - | (-36.2, 12.3, 0) | ... |
| ... | ... | ... | ... | ... | ... | ... | ... |
| 6:32:06.25 | (-39.0, 9.2, 0), (-37.8, 12.7, 0) | (-39.0, 9.2, 0) | - | ... | (-37.8, 12.7, 0) | - | ... |

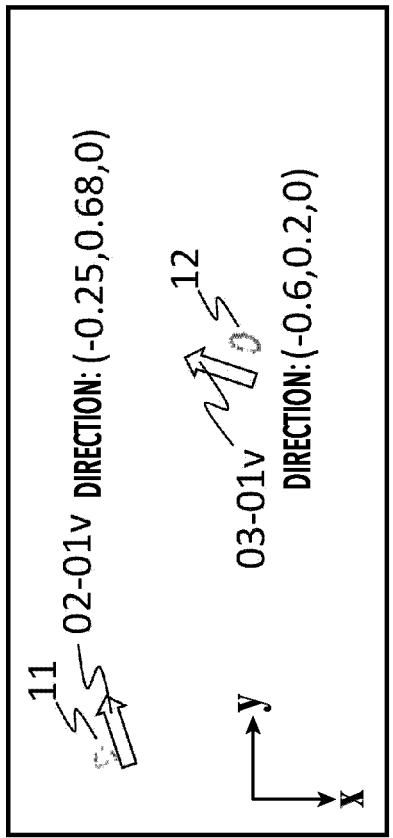
FIG.10A
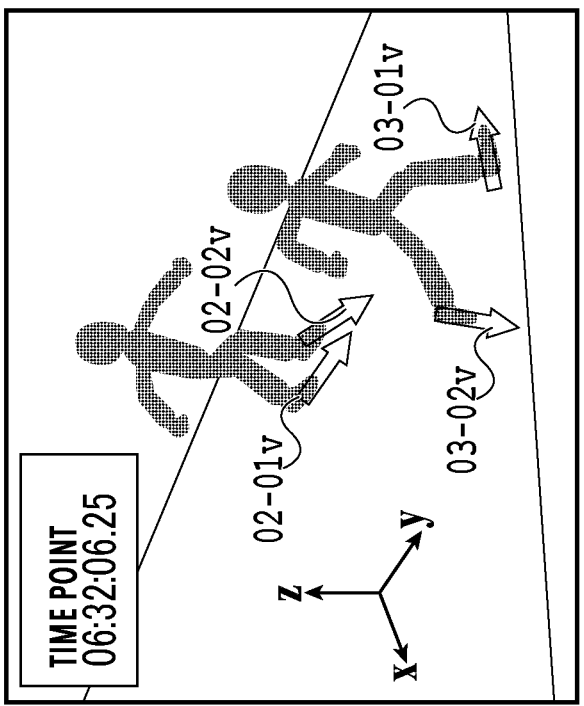
FIG.10B
| TIME POINT/MODEL ID | 01 | 02-01 | 02-02 | ... | 03-01 | 03-02 |
|---|---|---|---|---|---|---|
| ... | ... | ... | ... | ... | ... | ... |
| 6:32:05.32 | — | (-0.23,0.65,0) | - | ... | - | (-0.43,0.5,0) |
| 6:32:06.25 | — | (-0.25,0.68,0) | - | ... | (-0.6,0.2,0) | - |
FIG.10C

INFORMATION PROCESSING APPARATUS, INFORMATION PROCESSING METHOD, AND STORAGE MEDIUM FOR DETERMINING A CONTACT BETWEEN OBJECTS

BACKGROUND OF THE INVENTION

Field of the Invention

The present invention relates to a technique of analyzing three-dimensional models of objects.

Description of the Related Art

A technique is drawing attention in which multiple cameras are installed at different locations to perform synchronous image capturing and multiple captured images obtained from multiple viewpoints by the synchronous image capturing are used to generate a virtual viewpoint image. Such a technique allows a user to view, for example, highlight scenes of soccer, basketball, or the like from various angles and can thus provide better you-are-there feeling to the user than normal images.

Japanese Patent Laid-Open No. 2017-212592 describes a technique in which a three-dimensional model of an object is generated based on multiple captured images obtained by using multiple cameras and a virtual viewpoint image is generated by using the three-dimensional model.

The three-dimensional model of the object generated in the conventional technique may be used to perform analysis on a predetermined object, for example, to analyze movements of players in a soccer game. However, usability of the analysis on an object is desired to be further improved. For example, a contact between an object and a ground surface can be determined by using a three-dimensional model of the object. However, if which part of the object is coming into contact with the ground surface cannot be identified, the stride length, the direction of the foot, and the like of a player cannot be analyzed.

SUMMARY OF THE INVENTION

An information processing apparatus according to one aspect of the present invention is an information processing apparatus comprising: a first obtaining unit configured to obtain a first three-dimensional model expressing a position and a shape of a first object in a three-dimensional space based on images of the first object captured by a plurality of image-capturing devices at different locations; a second obtaining unit configured to obtain a second three-dimensional model expressing a position and a shape of a second object in the three-dimensional space; an identifying unit configured to identify a plurality of parts of the first object; a determining unit configured to determine a contact between a certain part of the first object and the second object based on the obtained first three-dimensional model and second three-dimensional model and an identification result of the plurality of parts; and an output unit configured to output information according to a determination result of the contact.

Further features of the present invention will become apparent from the following description of exemplary embodiments with reference to the attached drawings.

BRIEF DESCRIPTION OF THE DRAWINGS

FIGS. 10A to 10C are views explaining directions of contact portions;

DESCRIPTION OF THE EMBODIMENTS

Figure 1:
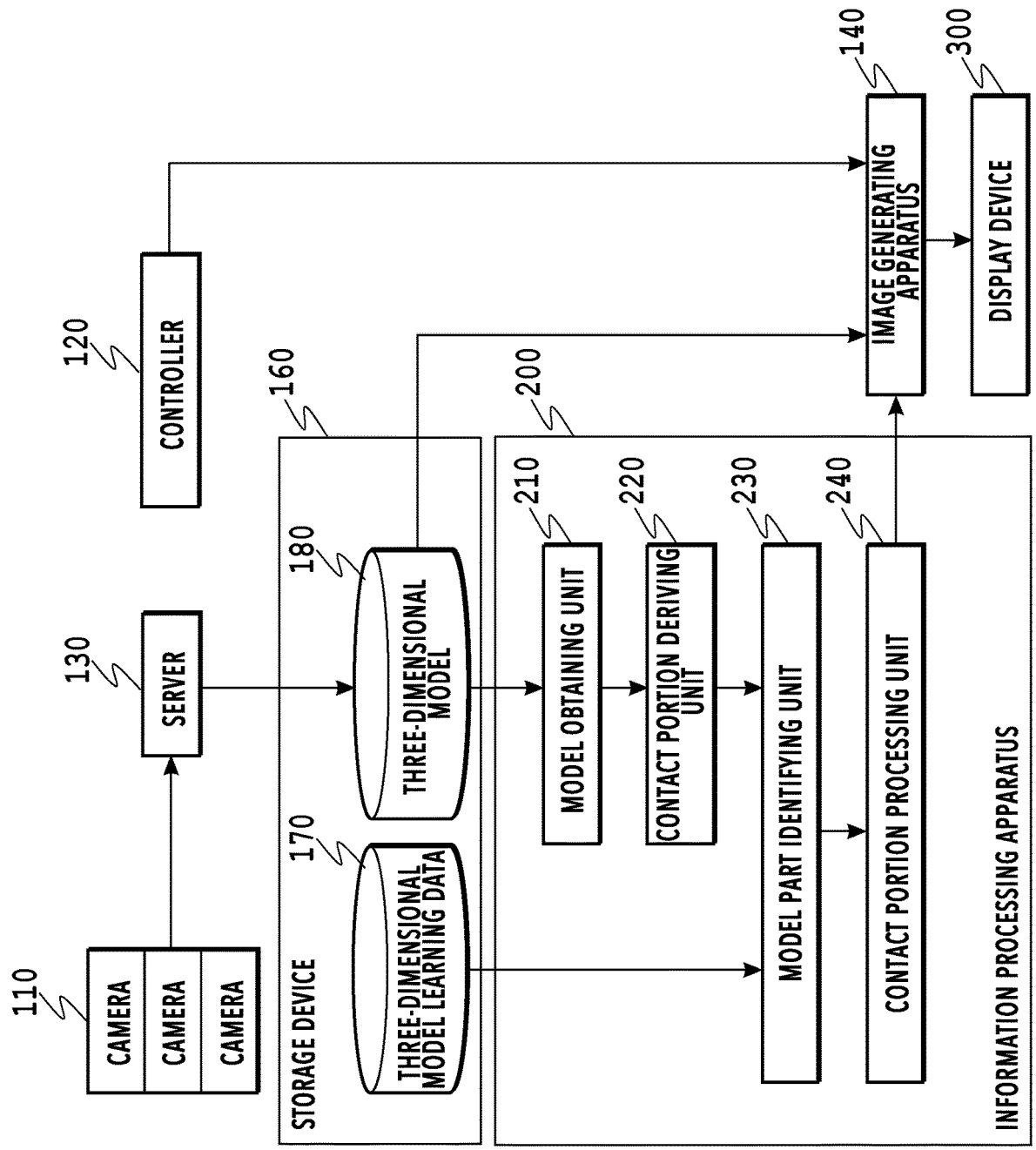
FIG. 1 is a diagram illustrating an overall configuration of a system.

Embodiments of the present invention are described below with reference to the drawings. Note that the following embodiments do not limit the present invention and not all combinations of the characteristics described in the embodiments are necessary for means for solving problems of the present invention. Note that the same configurations are described while being denoted by the same reference numerals.

Embodiment 1

In this embodiment, as an example, description is given of a system in which multiple cameras are installed respectively at different locations of a soccer stadium and which analyzes three-dimensional models generated by using multiple pieces of image data captured by using these multiple cameras. Moreover, an example in which analysis results are displayed to be superimposed on a virtual viewpoint image is described.

<Overall Configuration of System>

FIG. 1 is a diagram illustrating an overall configuration of the system used in the embodiment. The system includes multiple cameras 110, a controller 120, a server 130, an image generating apparatus 140, a storage device 160, an information processing apparatus 200, and a display device 300. The information processing apparatus 200 includes a model obtaining unit 210, a contact portion deriving unit 220, a model part identifying unit 230, and a contact portion processing unit 240. The information processing apparatus 200 functions as an analysis device that analyzes motions of parts of objects. Note that the configuration illustrated in FIG. 1 is merely an example and may include an apparatus collectively having the functions of the multiple apparatuses illustrated in FIG. 1. Moreover, for example, the functions of the information processing apparatus 200 may be processed in a distributed manner by multiple apparatuses. Furthermore, the information processing apparatus 200 and the image generating apparatus 140 may be implemented by the same apparatus.

The multiple cameras 110 are installed to capture images of the objects on a soccer field that is an image-capturing range, from multiple directions. The multiple cameras 110 transmit pieces of image-capturing data obtained in the image capturing to the server 130 via a network. Note that, although the multiple cameras 110 are described by using the same reference numeral, the multiple cameras 110 may vary in performance and type. In the embodiment, the cameras 110 include total of 26 cameras but the number of cameras is not limited to this.

The server 130 extracts foreground objects (for example, soccer players and a ball) by using the image-capturing data transmitted from the multiple cameras 110. Moreover, the server 130 generates three-dimensional models 180 expressing positions and shapes of the foreground objects in a three-dimensional space, by using principles of stereo measurement and stores the three-dimensional models 180 in the storage device 160 via the network. Moreover, the server 130 stores the three-dimensional models 180 of background objects (soccer stadium, soccer field, and soccer goals) obtained in advance by performing measurement using a laser scanner, in the storage device 160.

The controller 120 is an user interface (UI) that transmits instructions of a user to the image generating apparatus 140 connected via the network. The controller 120 generates information on the position, orientation, and focal distance of a virtual viewpoint based on an operation of the user and transmits the information to the image generating apparatus 140.

The image generating apparatus 140, the controller 120, the storage device 160, and the information processing apparatus 200 are connected to one another via the network. The image generating apparatus 140 generates the virtual viewpoint image according to a designated position and a direction of the virtual viewpoint, based on information from the controller 120 and the three-dimensional models 180 of the objects stored in the storage device 160. Moreover, the image generating apparatus 140 generates an image in which the analysis results transmitted from the information processing apparatus 200 are superimposed. The image generating apparatus 140 is connected to the display device 300 via the network or a video transmission path such as a serial digital interface (SDI) and displays the image in which the analysis results are superimposed on the virtual viewpoint image, on the display device 300.

Three-dimensional model learning data 170 stored in the storage device 160 is data created for the three-dimensional models of objects (humans in this example) in advance by performing machining learning relating to characteristics of parts of the three-dimensional models. The three-dimensional model learning data 170 is assumed to be stored in the storage device 160 in advance.

<Configuration of Information Processing Apparatus>

The model obtaining unit 210 of the information processing apparatus 200 is connected to the storage device 160 via the network and obtains the three-dimensional models 180 of the objects. The contact portion deriving unit 220 derives contact portions between the three-dimensional models of the foreground objects and the three-dimensional models of the background objects. The model part identifying unit 230 obtains the three-dimensional model learning data 170 and identifies parts of the three-dimensional models 180 of the foreground objects. The contact portion processing unit 240 is an analyzing unit that analyzes the contact portions of the parts identified by the model part identifying unit 230. The contact portion processing unit 240 transmits analysis results to the image generating apparatus 140 connected via the network.

Figure 2:
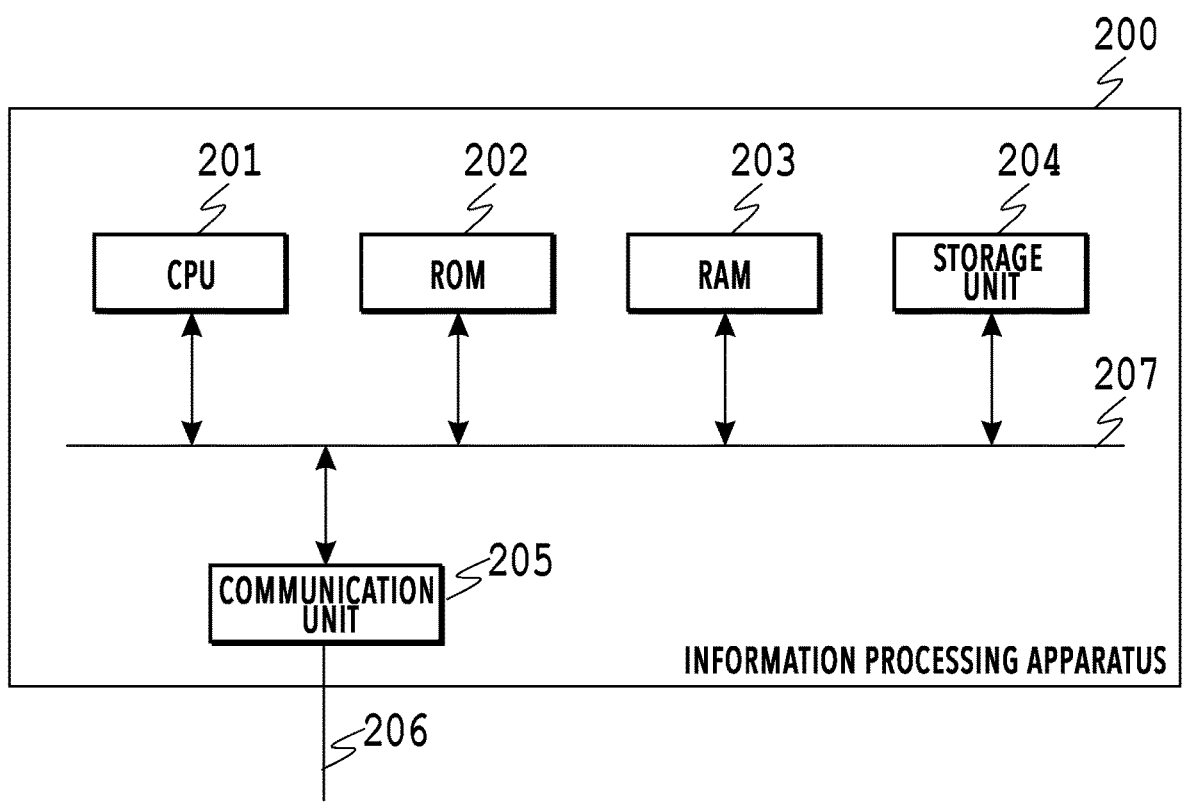
FIG. 2 is a hardware configuration diagram of an information processing apparatus.

FIG. 2 is a hardware configuration diagram of the information processing apparatus 200. The information processing apparatus 200 includes a CPU 201, a ROM 202, a RAM 203, a storage unit 204, and a communication unit 205.

The CPU 201 is a central processing unit that controls the entire information processing apparatus 200 and controls overall processing sequence of the information processing apparatus 200. The ROM 202 and the storage unit 204 store programs and data for implementing a processing flow to be described later. The RAM 203 is used to temporarily save data and load the programs. The communication unit 205 exchanges data with an external apparatus via a network 206. The communication unit 205 transmits the results of analysis in the contact portion processing unit 240 to the image generating apparatus 140. The components of the information processing apparatus 200 are connected to one another via a bus 207. Note that the information processing apparatus 200 may include a graphics processing unit (GPU) or one or multiple pieces of dedicated hardware different from the CPU 201. Then, at least part of the processing by the CPU 201 may be performed by the GPU or the dedicated hardware. Examples of the dedicate hardware include an application specific integrated circuit (ASIC), a field programmable gate array (FPGA), a digital signal processor (DSP), and the like.

<Flowchart>

Figure 3:
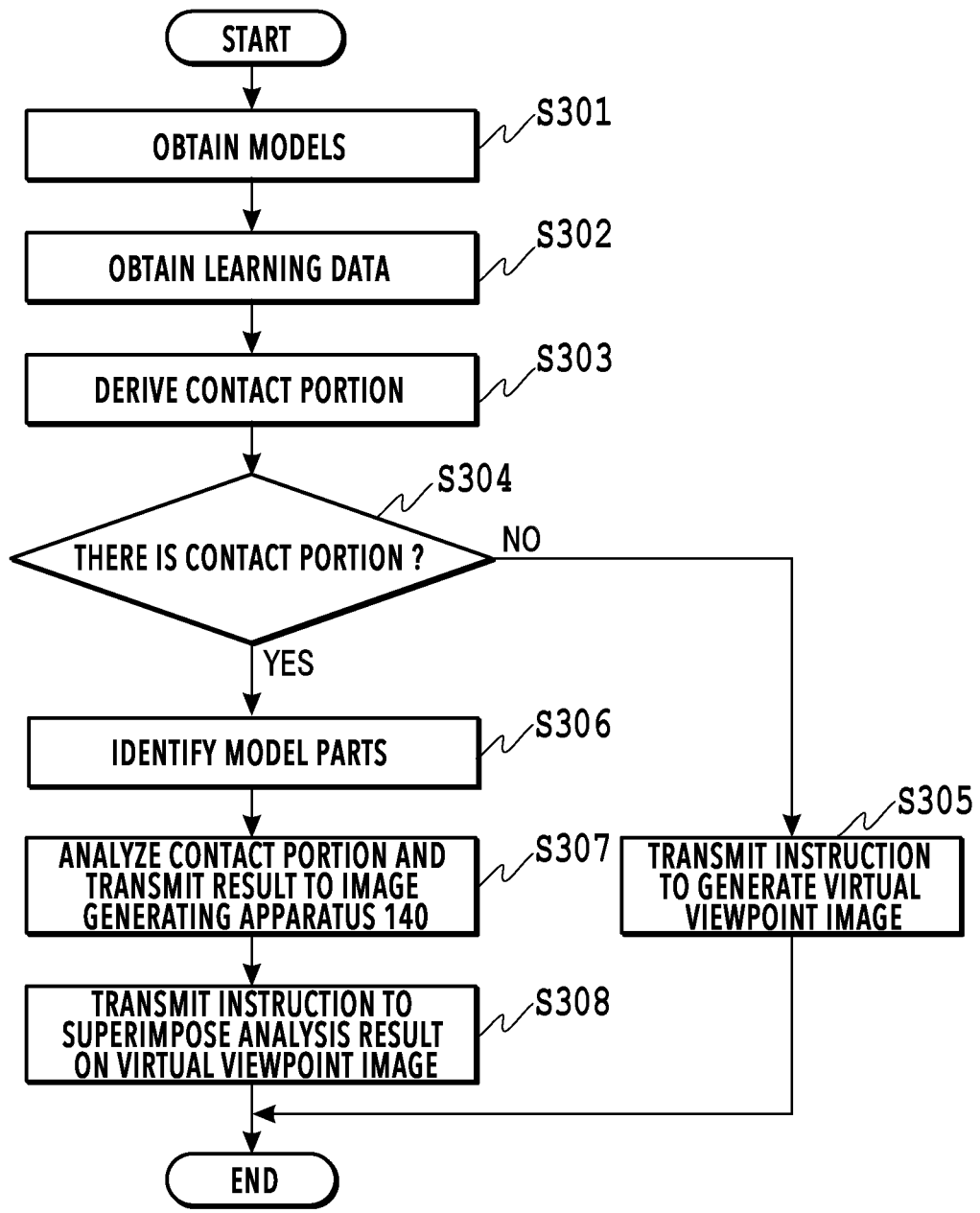
FIG. 3 is a flowchart illustrating a flow of processing of the information processing apparatus.

FIG. 3 is a flowchart illustrating a flow of processing of the information processing apparatus 200 in the embodiment. FIG. 3 illustrates a series of processes in which the information processing apparatus 200 performs analysis by obtaining the three-dimensional models in a predetermined period and the virtual viewpoint image of the predetermined period is displayed on the display device 300, the predetermined period being a target of the contact portion analysis in an image-capturing period in which the cameras 110 perform image capturing. The series of processes illustrated in the flowchart of FIG. 3 is performed by causing the CPU 201 to load a program code stored in the ROM 202 on the RAM 203 and execute the program code. Alternatively, functions of part or all of the steps in FIG. 3 may be implemented by hardware such as an ASIC or an electronic circuit. Note that sign "S" in the description of each process means step in the flowchart.

In S301, the model obtaining unit 210 obtains the three-dimensional models 180 of the objects at each time point in the predetermined period from the storage device 160. Each three-dimensional model is expressed as a mesh polygon or point cloud data and is obtained by reading a file written in a format describing the three-dimensional model, for example, a Wavefront OBJ format, for each object (person or thing). As described above, the three-dimensional model is data described in a predetermined format.

Moreover, the model obtaining unit 210 obtains the three-dimensional models of the background objects and the three-dimensional models of the foreground objects while distinguishing one from the other. Specifically, the model obtaining unit 210 obtains the three-dimensional models of contacting target objects (in this case, the foreground objects) and the three-dimensional models of contacted target objects (in this case, the background objects) while distinguishing one from the other.

Figure 4A:
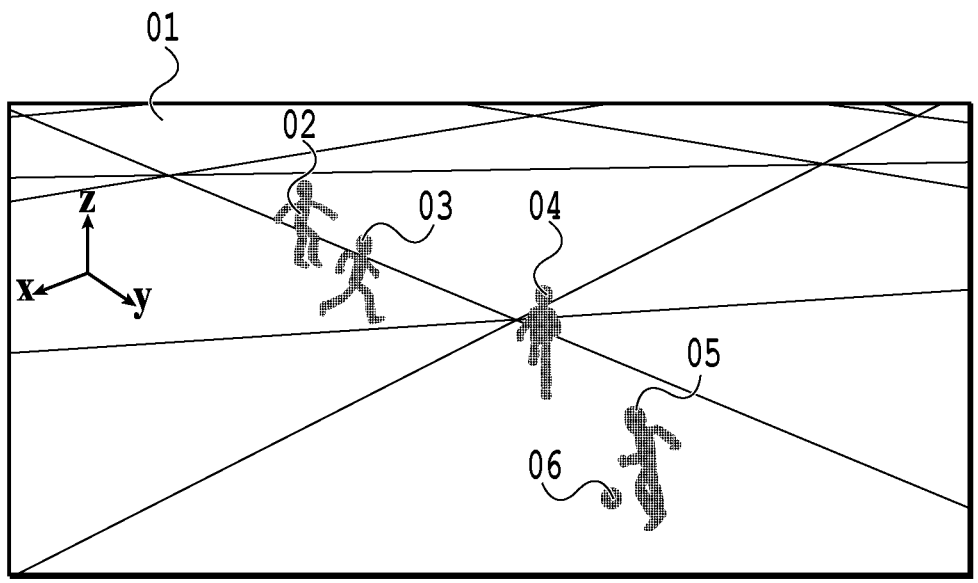
FIGS. 4A and 4B are views explaining three-dimensional models of objects.
Figure 4B:
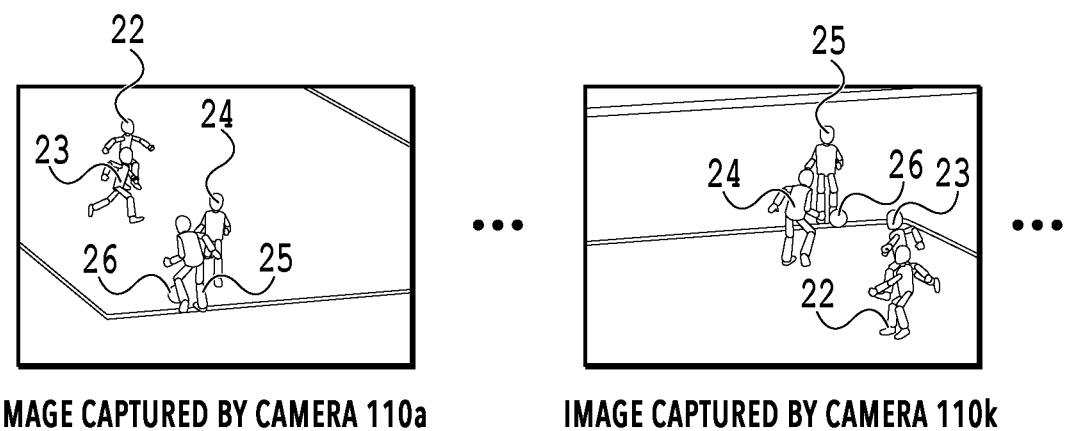

FIGS. 4A and 4B are views explaining the three-dimensional models of the objects. FIG. 4A is a view illustrating the three-dimensional models of the objects at a certain time point in the predetermined period. FIG. 4B is a view illustrating images captured by the cameras 110 at the certain time point. FIG. 4B illustrates an image captured by the camera 110a and an image captured by the camera 110k among images captured by the cameras 110a to 110z as representatives. FIG. 4A includes a mesh polygon of a soccer field 01 and three-dimensional models expressing players 02 to 05 and a ball 06 in point clouds. In FIG. 4A, the three-dimensional models appear at the respective positions in a world coordinate system by reading the three-dimensional models divided from object to object (person or thing) in a unit of file. Note that the drawings are illustrated for explanation and the screen illustrated in FIG. 4A is not necessarily displayed on a not-illustrated display unit connected to the information processing apparatus 200 (as a matter of course, the screen may be displayed). FIGS. 22 to 26 in FIG. 4B correspond to the players 02 to 05 and the ball 06 in FIG. 4A, respectively.

In S302, the model part identifying unit 230 obtains the three-dimensional model learning data 170 from the storage device 160. The three-dimensional model learning data 170 is data learned in advance by using range images of a human body and the positions and directions of parts (head, shoulders, right elbow, left elbow, right hand, left hand, waist, right knee, left knee, right foot, and left foot) in the range images. This learning data is created by using a publicly-known method used in, for example, Microsoft Kinect (registered trademark). Specifically, the learning data is data created by performing supervised learning in which the range images of a human body taking various postures are used as inputs and pixels and parts in the range images are learned by using a decision tree. Note that the method of learning is not limited to this and regression learning such as neural network or support vector machine may be used. A soccer ball or rugby ball may be learned in addition to the human body. Moreover, although data learned by using the range images is used in the embodiment, data obtained by learning the parts of a human body by using RGB color images may be used. Note that, although the flowchart of FIG. 3 describes an example in which the three-dimensional model learning data 170 is obtained in S302, the three-dimensional model learning data 170 only needs to be obtained before the processing of identifying model parts in S306 to be described later.

In S303, the contact portion deriving unit 220 performs calculation of contacts between the three-dimensional model of the background object and the three-dimensional models of the foreground objects and derives portions where contacts are occurring (hereafter, referred to as contact portions). Blender widely used in the field of physical computation and CG simulation can be used for the contact calculation. Note that the contact calculation is not limited to this and any method can be used. Each contact portion is expressed as a set of three-dimensional coordinates in the world coordinate system. Moreover, the contact portion deriving unit 220 performs clustering on the sets of the three-dimensional coordinates of the contact portions and obtains barycentric coordinates of the sets.

Figure 5:
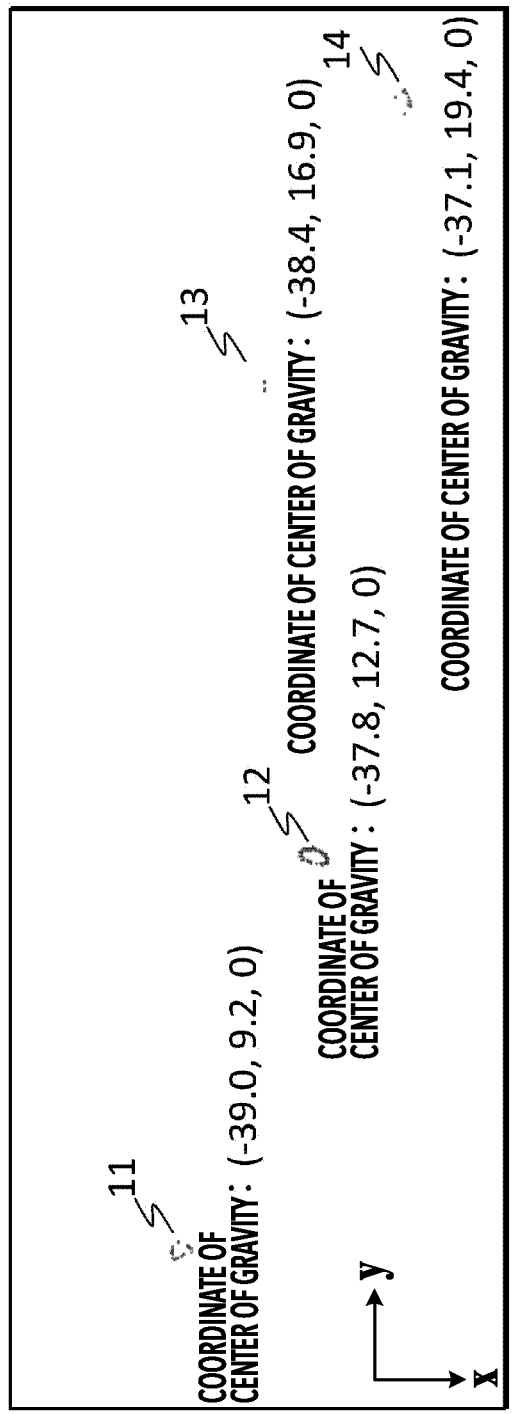
FIG. 5 is a view illustrating sets of three-dimensional coordinates of contact portions.

FIG. 5 is a view illustrating the sets of three-dimensional coordinates of the contact portions. The sets are distinguished as four clusters 11 to 14 by the clustering. The barycentric coordinates of the respective clusters are derived to be (x, y, z)=(−39.0, 9.2, 0), (−37.8, 12.7, 0), (−38.4, 16.9, 0), (−37.1, 19.4, 0). The contact portion deriving unit 220 performs the contact calculation of the three-dimensional models in the predetermined period at each time point and derives the contact portions at each time point.

The three-dimensional models obtained in S301 are pieces of data for the respective objects. Accordingly, the contact portion deriving unit 220 can derive to which object (human or ball) each cluster belongs. The barycentric coordinates of the sets of the contact portions derived by the contact portion deriving unit 220 are associated with information identifying the objects and stored in the RAM 203 as data of each time point.

In S304, the contact portion deriving unit 220 determines whether there is a contact portion as a result of the contact calculation. For example, the contact portion deriving unit 220 refers to the RAM 203 and determines whether the number of three-dimensional coordinates indicating the contact portions is zero or greater than zero. If there is a contact portion, the processing proceeds to S306. If there is no contact portion, the processing proceeds to step S305.

In S305, the information processing apparatus 200 causes the image generating apparatus 140 to generate the virtual viewpoint image. For example, the information processing apparatus 200 transmits an instruction indicating that there is nothing to be superimposed, to the image generating apparatus 140. The image generating apparatus 140 generates the virtual viewpoint image in the predetermined period according to parameters and like indicating the designated virtual viewpoint from the controller 120 and displays the virtual viewpoint image on the display device 300. An image as viewed from the virtual viewpoint can be generated as the virtual viewpoint image by using a computer graphic technique. A publicly-known technique can be used as appropriate for this generation processing. Then, the processing is terminated.

In S306, the model part identifying unit 230 identifies the parts of each three-dimensional model by using the learning data obtained in S302. As a result of the identification, each piece of point data belonging to the three-dimensional model is associated with one of the parts. Note that, although the processing of S306 is processing in which the parts outside the contact portions are also identified, the processing of S306 may be processing in which only the parts in the contact portions are identified. The model part identifying unit 230 thereby identifies which one of the parts each of the clusters of the contact portions derived in S304 is.

Figures 6A, 6B:
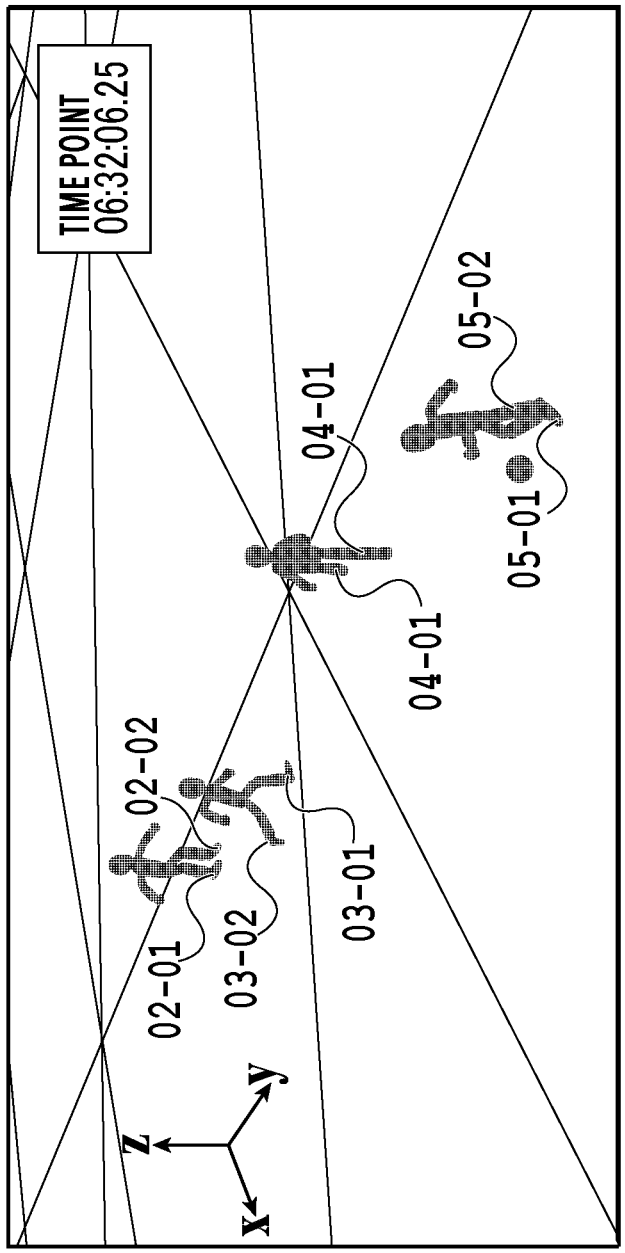
FIGS. 6A and 6B are views explaining an identification result.

FIGS. 6A and 6B are views describing the identification result of S306. FIG. 6A illustrates results of part identification. FIG. 6B illustrates results of storing the contact portions of each part in time series as table information. In this example, the left feet of the objects (players) 02 to 05 are identified by assigning identification IDs of 02-01, 03-01, 04-01, and 05-01 thereto, respectively. The right feet of the objects 02 to 05 are identified by assigning identification IDs of 02-02, 03-02, 04-02, and 05-02 thereto, respectively. Moreover, as illustrated in FIG. 6B, the barycentric coordinates of the contact portions of each part are associated with the contact time points and stored in the RAM 203. Note that, although not illustrated, the head, shoulders, right elbow, left elbow, right hand, left hand, waist, right knee, and left knee of the object 02 are identified by assigning identifications IDs of 02-03, 02-04, 02-05, 02-06, 02-07, 02-08, 02-09, 02-10, and 02-11 thereto, respectively. If there are contact portions of these parts, the barycentric coordinates of the contact portions of the respective parts are associated with the contact time point and stored in the RAM 203 as the table information as illustrated in FIG. 6B.

In S307, the contact portion processing unit 240 analyzes the contact portions stored in the RAM 203 and transmits an analysis result to the image generating apparatus 140. The contact portion processing unit 240 in the embodiment derives the stride length of an object. As described above, the left foot and the right foot of a certain object (for example, object 03) are identified by the model part identifying unit 230. The stride length can be obtained as a distance from a contact completion position of one foot to a contact start position of the other foot. Accordingly, the contact portion processing unit 240 refers to the table information stored in the RAM 203 and identifies the contact positions in a period from contact completion of a first interest part 03-02 (right foot of object 03) to contact start of a second interest part 03-01 (left foot of object 03). Then, the contact portion processing unit 240 calculates the distance between these contact positions to derive the distance from the contact completion position (−36.2, 12.3, 0) of the first interest part 03-02 to the contact start position (−37.8, 12.7, 0) of the second interest part 03-01. In this example, the stride length of the object 03 is derived to be 1.65 m. The contact portion processing unit 240 transmits the contact completion position, the contact start position, and the value of the stride length obtained as described above to the image generating apparatus 140. Although the description is given above by using the object 03 as an example, the contact portion analyzing processing may be performed similarly for each object. Note that it is assumed that an information processing apparatus 100 receives an instruction from the user in advance and what type of analysis (analysis of stride length in this example) is to be performed by the contact portion processing unit 240 is set based on this instruction.

In S308, the information processing apparatus 200 transmits an instruction to generate a virtual viewpoint image on which the analysis result is superimposed, to the image generating apparatus 140. The image generating apparatus 140 generates the virtual viewpoint image as in the processing described in S305 according to this instruction and then displays an image in which the analysis result is superimposed on the virtual viewpoint image, on the display device 300.

Figure 7:
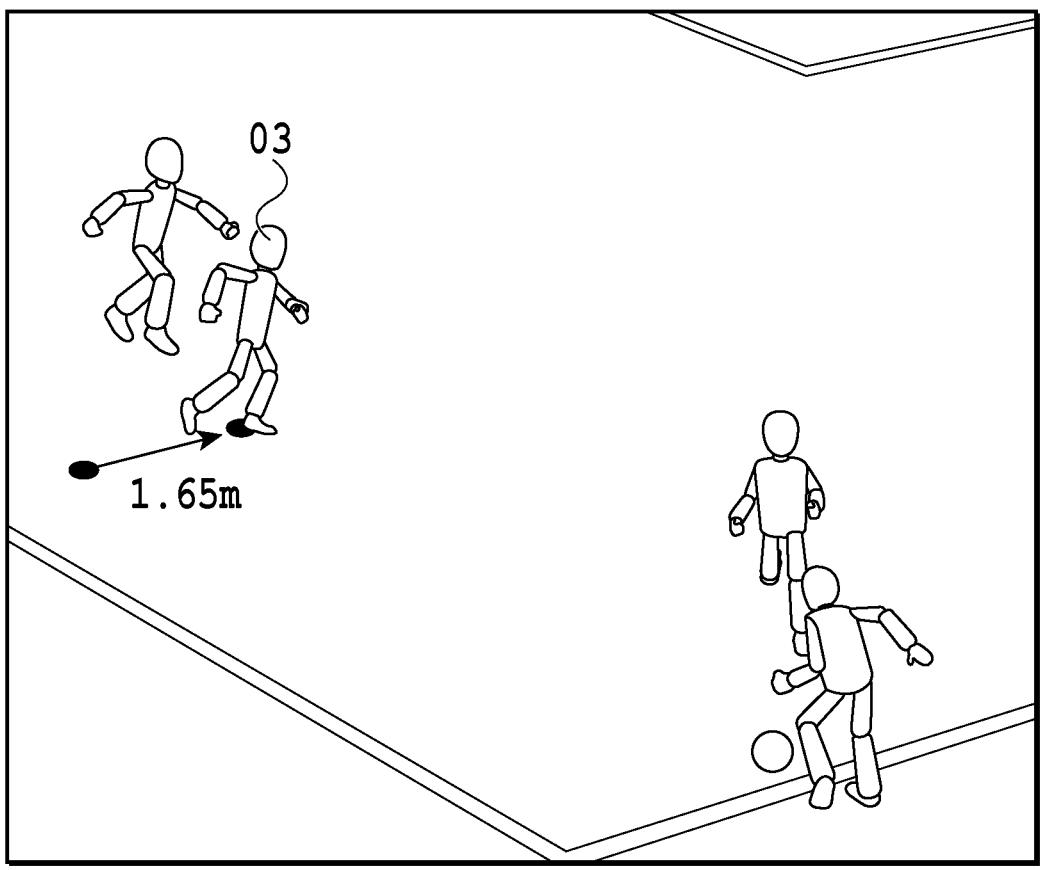
FIG. 7 is a view illustrating an example in which an analysis result is displayed to be superimposed on a virtual viewpoint image.

FIG. 7 is a view illustrating an example in which the analysis result is displayed on the display device 300 while being superimposed on the virtual viewpoint image. The image generating apparatus 140 generates the image in which the contact completion position, the contact start position, and the value of the stride length transmitted from the contact portion processing unit 240 are superimposed on the virtual viewpoint image by using objects of an arrow and circles of a predetermined size and displays the generated image on the display device 300. In FIG. 7, the contact positions of the object 03 with the ground and the stride length of the object 03 are displayed under the feet of the object 03. Note that, although only the stride length of the object 03 is displayed in a simple manner in FIG. 7, the image generating apparatus 140 can similarly display the contact completion position, the contact start position, and the value of the stride length of each object transmitted from the contact portion processing unit 240.

As described above, in the embodiment, the motions of the respective parts of the objects can be easily analyzed by identifying the contact portion between the three-dimensional model of the foreground object and the three-dimensional model of the background object for each part. For example, it is possible to derive the stride length of each player and superimpose the derived stride length on the virtual viewpoint image. The stride length at which a certain soccer player is moving in play can be thereby easily analyzed. Moreover, movements of multiple players in play can be easily analyzed. Furthermore, since the parts of the objects are identified from one another, it is possible to suppress the case where, for example, the hand laid on the ground or a contact portion formed by tumbling or the like is erroneously used for the deriving of the stride length.

Note that, although the contact between the mesh polygon of the background object and the point cloud of each foreground object is calculated in the embodiment, the contact may be a contact between mesh polygons, between point clouds, or between a point cloud and a mesh polygon. Moreover, the contact portion may be expressed by a mesh ID and a texture coordinate instead of the set of three-dimensional coordinates. Furthermore, although the stride length is described as the distance between the contact portion of the right foot and the contact portion of the left foot, the stride length may be derived as a distance between the contact portions of the right foot, between the contact portions of the left foot, or between contact portions of any other parts.

Moreover, in S307, the contact portion processing unit 240 may consider a situation where the shoulder or the waist is in contact with the ground as abnormal and store that the situation is abnormal while outputting this information to the image generating apparatus 140. Then, the image generating apparatus 140 may superimpose a predetermined notice, for example, information indicating that the situation is abnormal, on the virtual viewpoint image.

Furthermore, although description is given of the example in which the image generating apparatus 140 superimposes the analysis result on the virtual viewpoint image, in this case, the image generating apparatus 140 may superimpose only part of the analysis result instead of the entire analysis result. For example, in the case where the image generating apparatus 140 receives designation of the object to be the target of analysis from the controller 120, the image generating apparatus 140 may display only the analysis result of the designated object in a manner superimposed on the virtual viewpoint image. Moreover, the analysis result may be displayed in a region other than a display region of the virtual viewpoint image in the display device.

Moreover, although the analysis processing and the transmission of the result in S307 is described by using the example in which the results for the predetermined period being the target of analysis are transmitted to the image generating apparatus 140 all at once and displayed while being superimposed on the images of the corresponding time points in the image generating apparatus 140, the analysis processing and the transmission of the result are not limited to this example. For example, the analysis processing and the transmission of the result in S307 may be performed at each time point in the predetermined period. For example, in the case where a contact of a predetermined object is found as a result of the analysis at the first time point, the result of this analysis processing is transmitted to the image generating apparatus 140 and displayed while being superimposed on the predetermined object in the image of the first time point. Then, in the case where no contact is found as a result of the analysis at the second time point, the analysis result displayed while being superimposed is not updated and the analysis result of the first time point is continuously displayed while being superimposed on an image of the second time point. Thereafter, in the case where the contact of the predetermined object is found again as a result of the analysis at the third time point, the result of this analysis processing is transmitted to the image generating apparatus 140 and the analysis result of the third time point is displayed while being superimposed on the predetermined object in the image of the third time point. In other words, the analysis result of the first time point is not updated at the second time point and is updated by the analysis result of the third time point. The analyses result may be added and displayed from time to time as described above.

Embodiment 2

In Embodiment 1, description is given mainly of the example in which the stride length of an object is obtained by the analysis. In this embodiment, description is given of the example in which directions of the parts (for example, directions of feet) in the contact portions are obtained by the analysis. Moreover, in the embodiment, description is given of the example in which the analysis result is not displayed while being superimposed on the virtual viewpoint image and instead the information processing apparatus 200 displays the analysis results on the display device 300. Furthermore, in the embodiment, description is also given of processing performed in the case where, unlike in Embodiment 1, the three-dimensional models obtained by the model obtaining unit 210 of the information processing apparatus 200 are not pieces of model data for the respective objects.

As described above, the embodiment includes configurations and processing different from those of Embodiment 1 but the main difference is that an object of the analysis is different. The other points may be the same as those of Embodiment 1. Specifically, the directions of the feet may be displayed while being superimposed on the virtual viewpoint image and the three-dimensional models obtained by the model obtaining unit 210 may be pieces of model data for the respective objects as in Embodiment 1. Description of configurations and a processing flow similar to those of Embodiment 1 is omitted.

<Overall Configuration of System>

Figure 8:
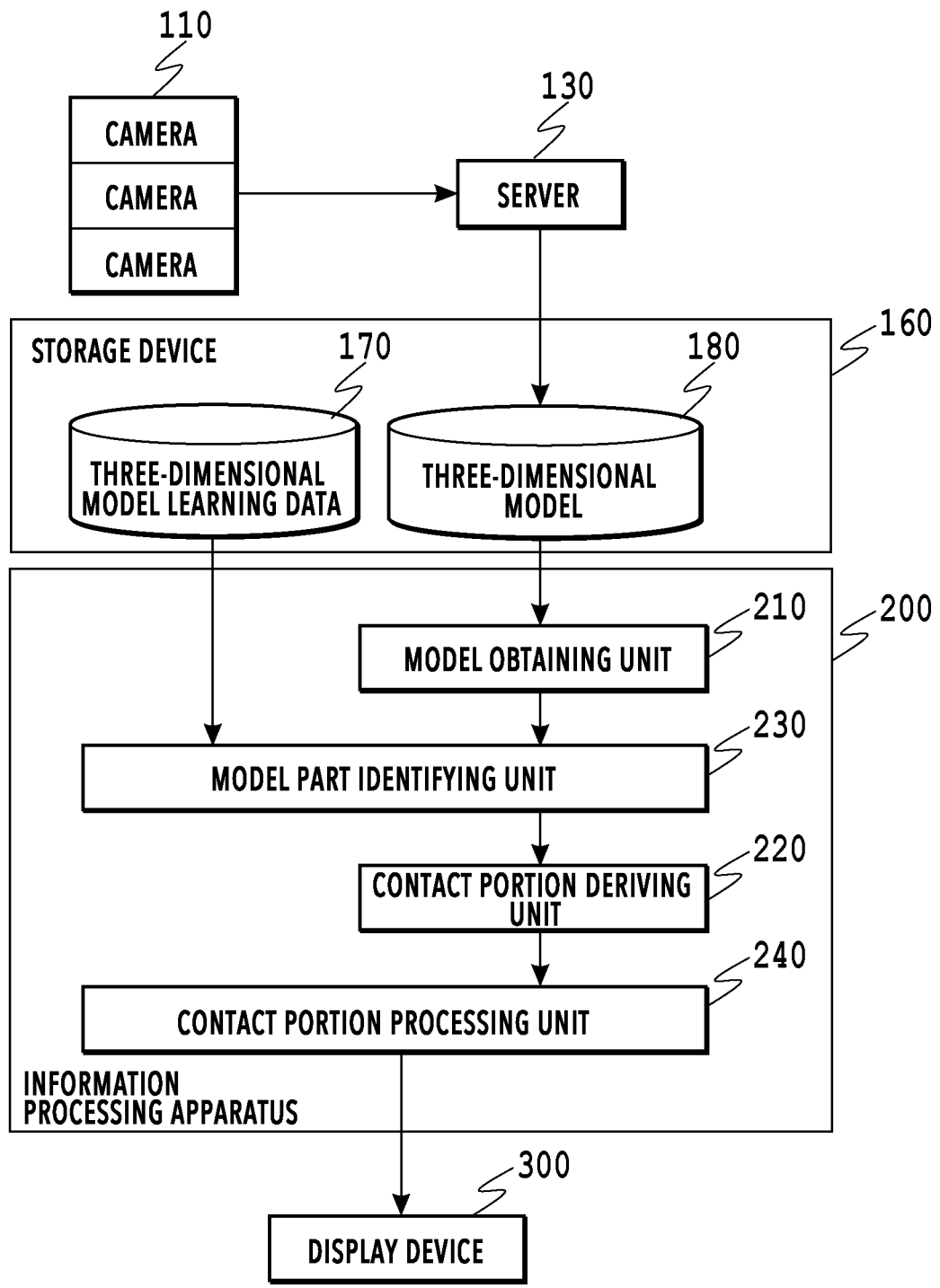
FIG. 8 is a diagram illustrating an overall configuration of a system.

FIG. 8 is a diagram illustrating an overall configuration of a system in the embodiment. The system illustrated in FIG. 8 includes no controller 120 or image generating apparatus 140 illustrated in FIG. 1. The contact portion processing unit 240 is connected to the display device 300 via the network or the video transmission path such as SDI and displays an analysis result of directions in the contact portions as an image on the display device 300.

Unlike in Embodiment 1, the three-dimensional models 180 of the objects stored in the storage device 160 of the embodiment are data in which the foreground objects are not distinguished from one another. The model obtaining unit 210 obtains the three-dimensional models 180 of the objects by reading files. The model obtaining unit 210 obtains the three-dimensional models of the background objects being the contacted targets and the three-dimensional models of the foreground objects being the contacting targets while distinguishing the two types of the models from each other.

Although the model part identifying unit 230 of the embodiment is configured to perform the identification processing of the model parts before the deriving of the contact portions unlike in Embodiment 1, the model part identifying unit 230 may perform the identification processing of the model parts after the deriving of the contact portions as in Embodiment 1.

The model part identifying unit 230 identifies the parts of the objects based on the three-dimensional model learning data 170 while distinguishing (dividing) the three-dimensional models of the foreground objects from object to object. For each of the parts identified by the model part identifying unit 230, the contact portion deriving unit 220 derives the contact portion of the three-dimensional model 180 of the object identified by the model part identifying unit 230. The contact portion processing unit 240 analyzes the parts of the contact portions and stores the directions of the parts in the RAM 203 as three-dimensional vectors.

<Flowchart>

Figure 9:
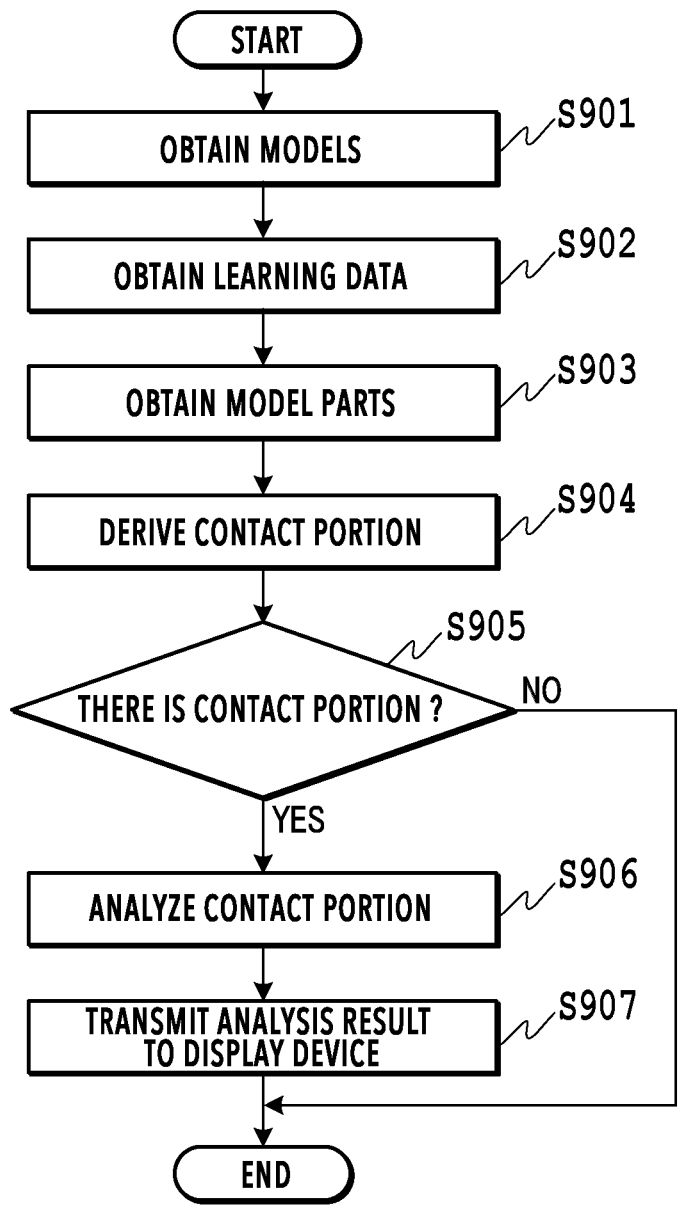
FIG. 9 is a flowchart illustrating a flow of processing of an information processing apparatus.

FIG. 9 is a flowchart illustrating a flow of processing of the information processing apparatus 200 in the embodiment. FIG. 9 illustrates a series of processes in which the information processing apparatus 200 performs analysis by obtaining the three-dimensional models in a predetermined period being the target of the contact portion analysis and the analysis result in this period is displayed on the display device 300.

In S901, the model obtaining unit 210 obtains the three-dimensional models 180 of the objects in the predetermined period from the storage device 160. The three-dimensional models 180 of the embodiment are data in which the foreground objects are not distinguished from one another.

In S902, the model part identifying unit 230 obtains the three-dimensional model learning data 170 from the storage device 160. As described in Embodiment 1, the three-dimensional model learning data 170 is data learned in advance by using the range images of a human body and the positions and directions of parts (head, shoulders, right elbow, left elbow, right hand, left hand, waist, right knee, left knee, right foot, and left foot) in the range images. In other words, the parts in the three-dimensional model learning data 170 include data on the directions. For example, the foot parts include data in which the direction from the heel to the toe is set as a positive direction.

In S903, the model part identifying unit 230 performs processing of identifying the model parts. In S903, the model part identifying unit 230 first performs clustering on the three-dimensional models of the foreground objects obtained in S901 to distinguish data of each object. Then, the model part identifying unit 230 identifies the parts of each object by using the three-dimensional model learning data 170. Each piece of point data belonging to the object is associated with one of the parts as a result of the identification. Moreover, since the parts in the three-dimensional model learning data 170 include data on the directions, the model part identifying unit 230 associates three-dimensional vectors indicating the directions with the identification result.

Note that the three-dimensional models 180 of the objects obtained by the model obtaining unit 210 in the embodiment is data in which the objects are not distinguished from one another. Thus, in order to identify the movements of the objects in the time direction, the model part identifying unit 230 performs tracking by deriving the center of gravity of the objects (whole) and associating the objects in the time direction such that the distance from the derived center of gravity to the center of gravity of the objects at the previous time point is minimized. The movement in the time direction can be thereby identified and this achieves the same state as the state where the data in which the objects are distinguished from one another as described in Embodiment 1 is obtained. Note that the model part identifying unit 230 may perform tracking by deriving the center of gravity of each part instead of deriving the center of gravity of the objects (whole).

In S904, the contact portion deriving unit 220 performs the calculation of contacts between the three-dimensional model of the background object and the three-dimensional model of the foreground object for each of the objects distinguished and tracked in the time direction and derives the contact portions. The contact portion deriving unit 220 associates the objects, the parts of the objects, and the direction of the parts with the derived contact portions and stores them in the RAM 203 as data of each time point.

Note that although the example in which the model parts are identified and then the contact portions are derived is described in the embodiment, the configuration may be such that the contact portions are derived and then the model parts are identified as described in Embodiment 1. The order of processing may be any order as long as the contact portions are derived and the model parts are identified (this also applies to Embodiment 1).

In S905, the contact portion deriving unit 220 determines whether a contact portion is found as a result of the contact calculation. For example, the contact portion deriving unit 220 refers to the RAM 203 and determines whether the number indicating the direction of the part corresponding to the contact portion is zero or is greater than zero. If a contact portion is found, the processing proceeds to S906. If no contact portion is found, the processing is terminated.

In S906, the contact portion processing unit 240 analyzes the contact portions. The contact portion processing unit 240 derives the directions of the contact portions in a contact plane. FIGS. 10A to 10C are views explaining the directions of the contact portions. FIG. 10A is a view illustrating the directions of the identified parts (for example, directions of feet) and the directions of the parts 02-01 and 03-01 are indicated by using three-dimensional vectors 02-01*v* and 03-01*v*, respectively. The directions of the parts 02-02 and 03-02 are similarly indicated by using three-dimensional vectors 02-02*v* and 03-02*v*, respectively. The three-dimensional vectors of the present example are assumed to be unit vectors and express information on only the directions. In other words, the arrows in the drawings only express the directions and have no information on magnitudes. The contact portion processing unit 240 obtains the directions of the parts of the other contact portions that are not illustrated.

FIG. 10B is a view illustrating the contact portions in the contact plane and the directions of the respective parts. The contact plane of FIG. 10B includes a cluster 11 and a cluster 12. The cluster 11 corresponds to the contact portion of the part 02-01 and the cluster 12 corresponds to the contact portion of the part 03-01. The directions of the contact portions 02-01 and 03-01 in the contact plane are derived by projecting the three-dimensional vectors 02-01*v* and 03-01*v* on the contact plane, as (x, y, z)=(−0.25, 0.68, 0), (−0.6, 0.2, 0), respectively. These coordinates are the world coordinates common to all objects and are derived by projecting the three-dimensional vectors 02-01*v* and 03-01*v* (unit vectors) from the centers of gravity of the respective clusters, onto the contact plane. In the embodiment, since the contact plane is the ground, the values are "0" in the z axis. Note that, as described in Embodiment 1, the coordinates of the contact portions are derived by the contact portion deriving unit 220.

FIG. 10C is a table storing the directions of the contact portions together with the time points. The contact portion processing unit 240 stores the information as illustrated in FIG. 10C in the RAM 203 as a result of the analysis processing. In the table illustrated in FIG. 10C, the analysis result at the time point 06:32:06.25 corresponds to the directions of the parts in the contact plane illustrated in FIG. 10B. As described above, the contact portion processing unit 240 analyzes the directions of the parts in the contact portions at each time point and stores the results. Note that, although not illustrated, the position of the center of gravity of each cluster set may be stored in the RAM 203 together with the time point as described in Embodiment 1.

Figure 11:
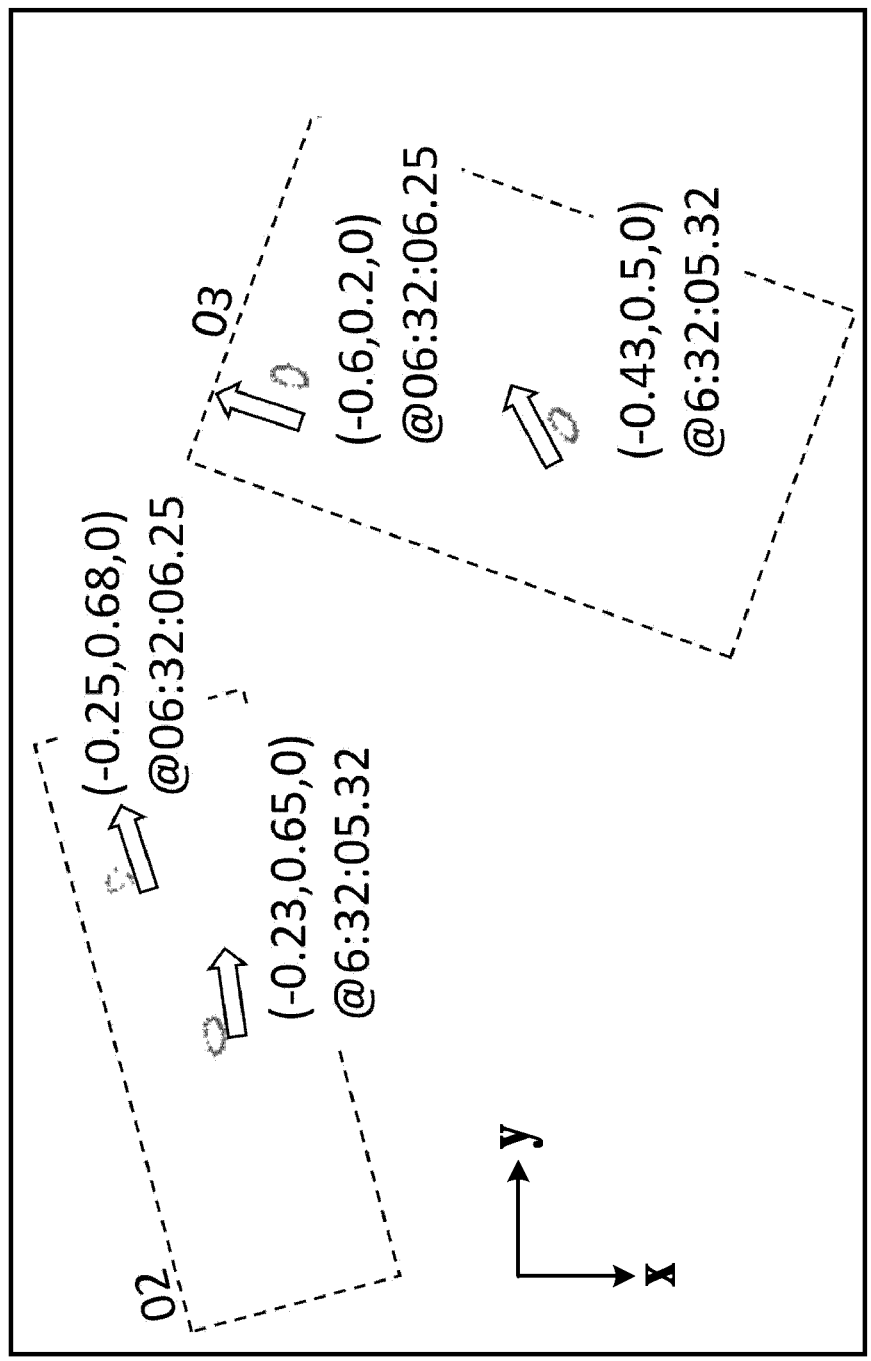
FIG. 11 is an example of an image illustrating analysis results.

In S907, the contact portion processing unit 240 generates an image illustrating the analysis result and transmits the image to the display device 300. The display device 300 displays the transmitted image. FIG. 11 is an example of the image illustrating the analysis result. The contact portion processing unit 240 renders the contact portions for each object in time series and generates an image in which the directions of the respective contact portions and the time point are displayed as arrows and a text. Moreover, the contact portion processing unit 240 surrounds the contact portions of each object in time series with a rectangle and assigns an object number ("02" and "03" in FIG. 11) to the rectangle. The contact portion processing unit 240 transmits the image generated as described above to the display device 300 to display the image. Note that this example is an example in which the period being the target of analysis is from the time point 06:32:05.32 to the time point 06:32:06.25.

Although the example in which only the information on the direction is used as the three-dimensional vector is described in the embodiment, each part may be tracked in the time direction to derive speed. Then, the derived speed may be used as the magnitude of the three-dimensional vector. In this case, the speed just before the contact or the average speed (or maximum speed) from the previous contact may be stored for each contact portion while being associated with the contact portion.

As described above, according to the embodiment, for example, the directions of feet of a certain soccer player in play can be easily analyzed by deriving the directions of the contact portions and displaying the directions as an illustration.

Note that the method of expressing the analysis result is not limited to that described above and analysis results of multiple time points can be sequentially displayed as a video or the directions of the respective parts and the directions of the respective contact portions may be simultaneously three-dimensionally rendered. Moreover, the positions and directions of the contact portions can be displayed to be superimposed on the virtual viewpoint image together with the movements (stride length) of the contact portions described in Embodiment 1.

Embodiment 3

In Embodiments 1 and 2, description is given mainly of the example in which the stride length or the direction of the foot of a soccer player is analyzed. In this embodiment, description is given of an example in which movements of a cyclist and a bicycle as well as a goal scene in a bicycle race are analyzed. Specifically, description is given of an example in which the contacting target is not a human.

Description is given below based on configurations and a processing flow similar to those in Embodiment 2. Note that the processing may be performed according to the configurations and the processing flow similar to those in Embodiment 1. Points different from Embodiment 2 are mainly described below.

The three-dimensional models 180 of the objects in the embodiment include, in addition to three-dimensional models of foreground objects (cyclist and bicycle) and a three-dimensional model of a background object, a mesh polygon model of a virtual perpendicular plane (referred to as a goal plane) on a goal line. The goal plane is handled as one type of background object.

The three-dimensional model learning data 170 in the embodiment includes data obtained by learning the three-dimensional models of the bicycle and the cyclist on the bicycle. Parts of the bicycle are data obtained by performing learning with the bicycle divided into three parts of a front wheel, a rear wheel, and other parts.

The analysis result of contact portions in the embodiment includes contact portions of the front wheel and the rear wheel of the bicycle. Moreover, in the embodiment, a contact portion between the foreground object that is the contacting target and the goal plane that is the contacted target is also analyzed. An object finishing first can be analyzed by analyzing the contact portion on the goal plane. In the embodiment, the aforementioned analysis is performed in S906.

Figure 12:
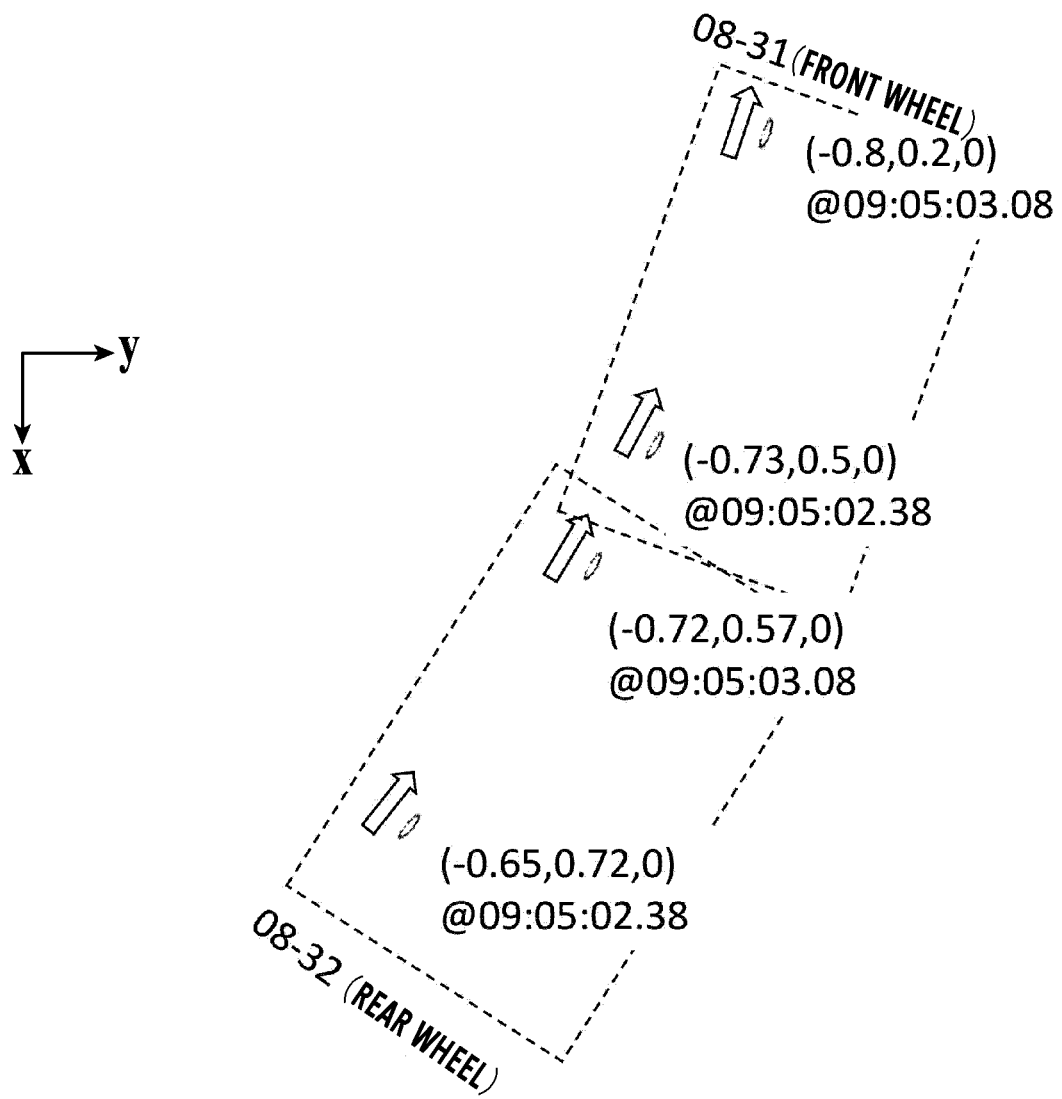
FIG. 12 is a view illustrating an example of analysis results.

In S907, the contact portion processing unit 240 transmits the result of analysis in S906 to the display device 300. FIG. 12 is a view illustrating an example of the analysis result displayed on the display device 300. As illustrated in FIG. 12, the contact portions of the front wheel and the rear wheel are rendered on a contact plane at predetermined time intervals, for example, every 0.5 seconds and displayed as an analysis result image with texts and arrows indicating the directions.

Figures 13A, 13B:
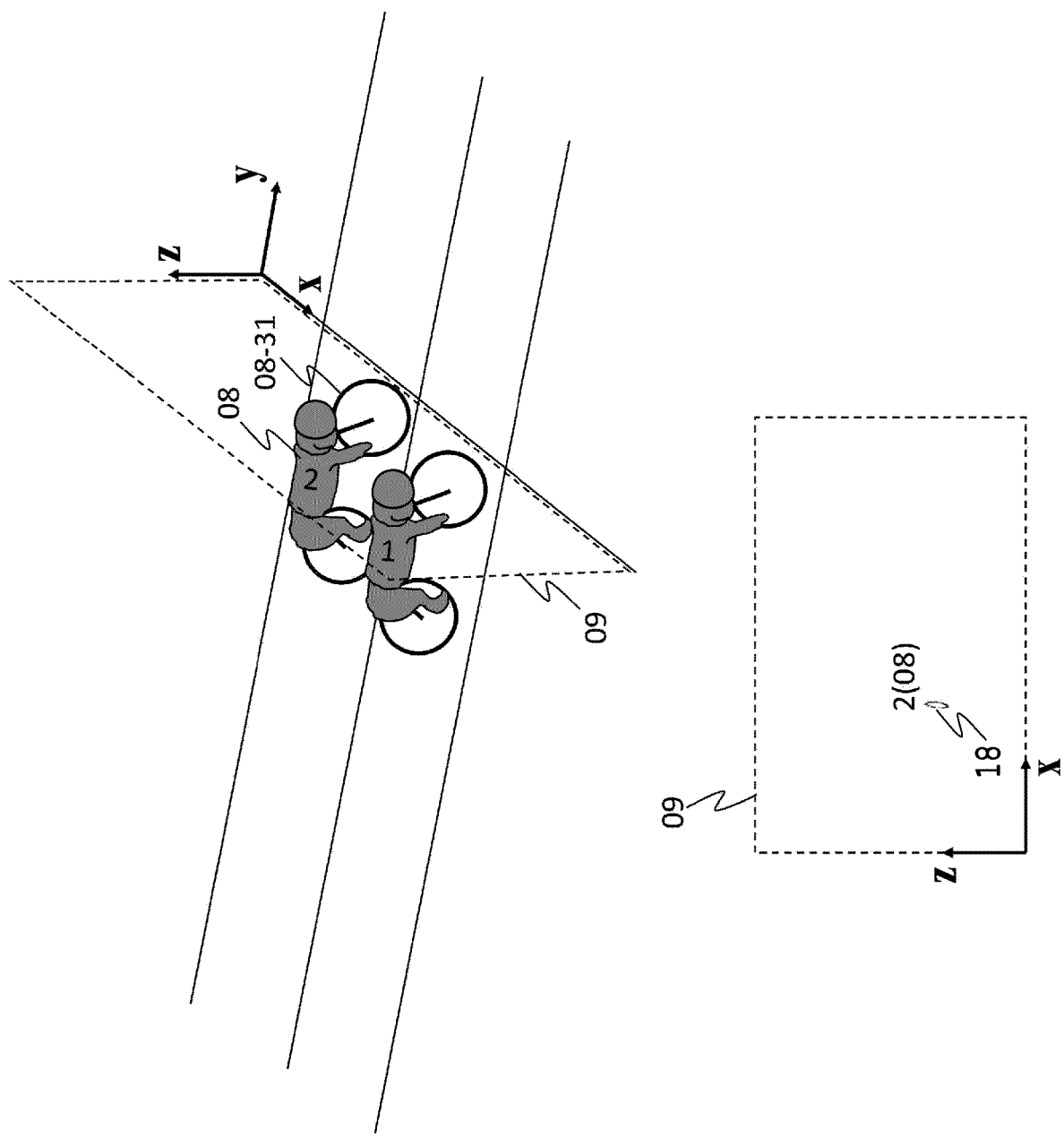
FIGS. 13A and 13B are views illustrating images of analysis results.

FIGS. 13A and 13B are views illustrating images of the analysis result in the case where a predetermined period being the target of analysis includes a period in which a bicycle passes the goal plane. FIG. 13A is a view illustrating states of objects on the goal plane. FIG. 13B illustrates a contact portion in the goal plane that is a virtual flat plane set in the three-dimensional space. If there is a contact portion in the goal plane 09, the contact portion processing unit 240 adds the object number "08" or the uniform number "2" of the cyclist to a contact portion 18 in the goal plane 09 as a text and additionally displays the number as an analysis result image.

As described above, in the embodiment, movements of contact portions can be analyzed also in a game in which a person does not directly bring the feet into contact with the ground. Specifically, it is possible to analyze movements of a cyclist and a bicycle as well as a goal scene in a bicycle race. Moreover, this analysis is not limited to a bicycle race and similar analysis can be also performed in races such as a horse race.

Embodiment 4

In Embodiments 1 to 3, description is mainly given of the example in which the model parts are identified by obtaining the three-dimensional model learning data 170 and comparing the three-dimensional models with the learning data. In the embodiment, description is given of an example in which the model parts are identified without using the learning data. In the embodiment, the user designates the model parts by using an input device. Note that, in order to analyze the movements of the model parts, the model parts need to be identified at representative points on a time series in a predetermined period being the target of analysis. In the embodiment, description is given assuming that the user does not have to designate the model parts at each representative point on the time series and only needs to designate the model parts at a predetermined time point.

Figure 14:
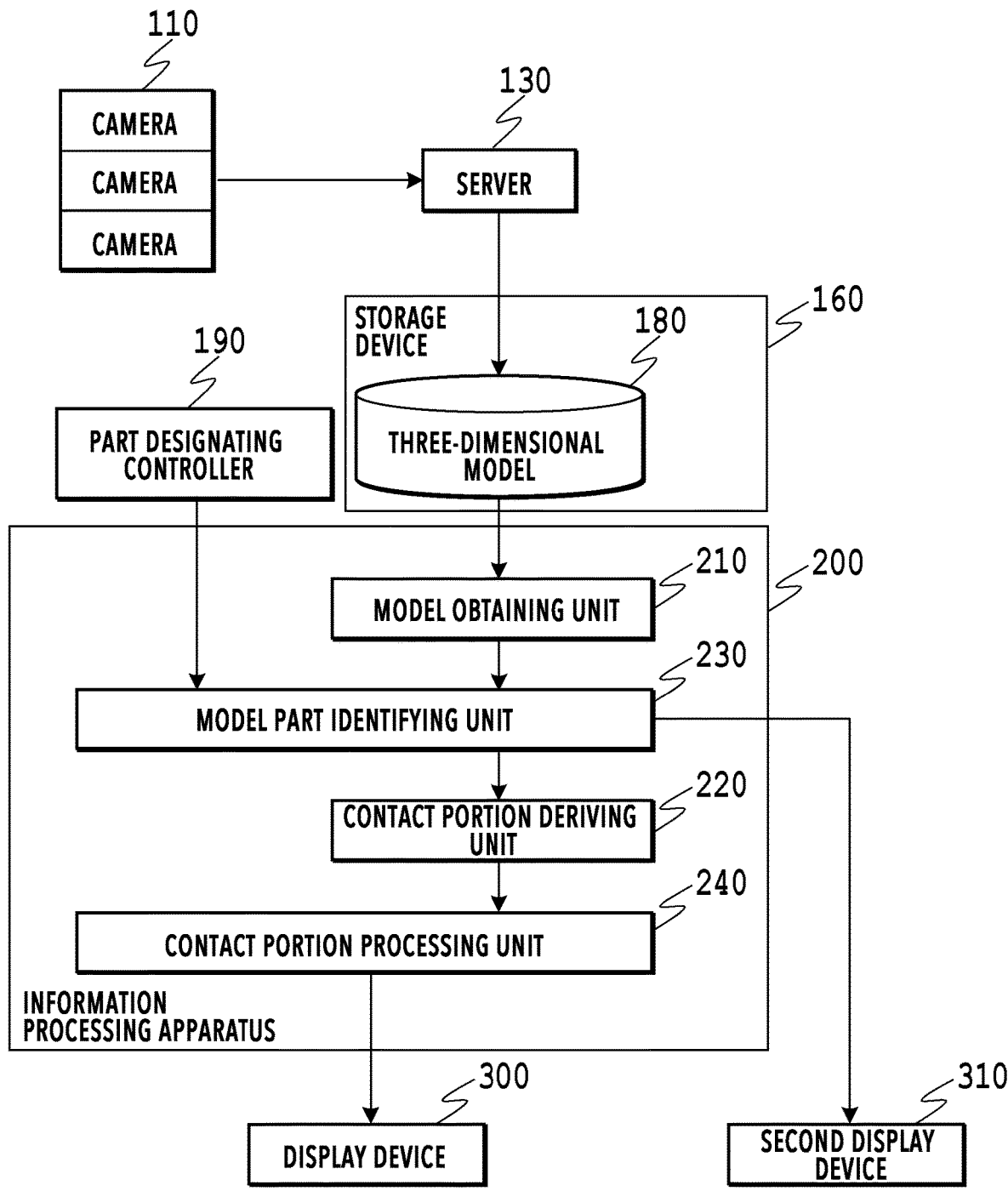
FIG. 14 is a view illustrating an overall configuration of a system.

FIG. 14 is a diagram illustrating an overall configuration of a system in the embodiment. Points different from Embodiment 2 are mainly described below. Note that a mode in which the analysis result is displayed on the virtual viewpoint image as described in Embodiment 1 may be employed. The storage device 160 of the embodiment stores no learning data. The system of the embodiment further includes a part designating controller 190 that is an input device and a second display device 310 in addition to the configuration of Embodiment 2. The part designating controller 190 outputs instructions to the model part identifying unit 230 of the information processing apparatus 200. The model part identifying unit 230 controls display of the second display device 310.

The part designating controller 190 is, for example, a mouse. The user designates parts on the three-dimensional model 180 of each object displayed on the second display device 310 and directions of the parts by mouse dragging. The model part identifying unit 230 is connected to the part designating controller 190 via the network and generates a user interface screen used by the user to designate the parts by clicking. Moreover, the model part identifying unit 230 is connected to the second display device 310 via the network or the video transmission path such as SDI and causes the second display device 310 to display an image in which the three-dimensional model of each object is rendered to allow the user to designate the parts. Specifically, the model part identifying unit 230 functions as a display control unit that controls display of the second display device 310. Note that, although FIG. 14 illustrates an example in which there are two display devices, the second display device 310 connected to the model part identifying unit 230 and the display device 300 connected to the contact portion deriving unit 220 may be the same device.

Figure 15:
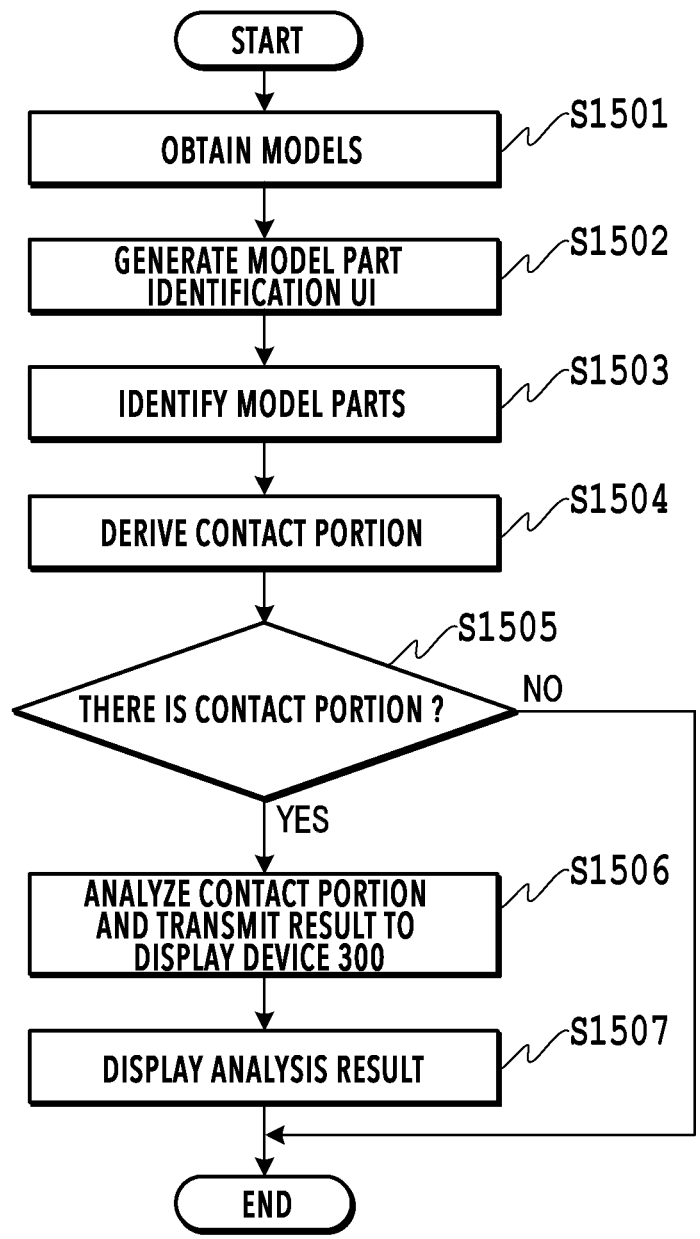
FIG. 15 is a flowchart illustrating a flow of processing of an information processing apparatus.

FIG. 15 is a flowchart illustrating a flow of processing of the information processing apparatus 200 in the embodiment. FIG. 15 illustrates a series of processes in which the information processing apparatus 200 performs analysis by obtaining the three-dimensional models in a predetermined period being the target of contact portion analysis and the analysis result in this period is displayed on the display device 300.

In S1501, the model obtaining unit 210 obtains the three-dimensional models 180 of the objects in the predetermined period, from the storage device 160. The three-dimensional models 180 in the embodiment are data in which the foreground objects are not distinguished from one another.

In S1502, the model part identifying unit 230 generates an UI for mode part identification. First, the model part identifying unit 230 performs clustering on the three-dimensional models of the foreground objects to distinguish the objects from one another. Then, the model part identifying unit 230 generates the model part identification UI for each object and outputs the model part identification UI to the second display device 310 together with the rendering result (image data) of the three-dimensional model of the object.

Figure 16:
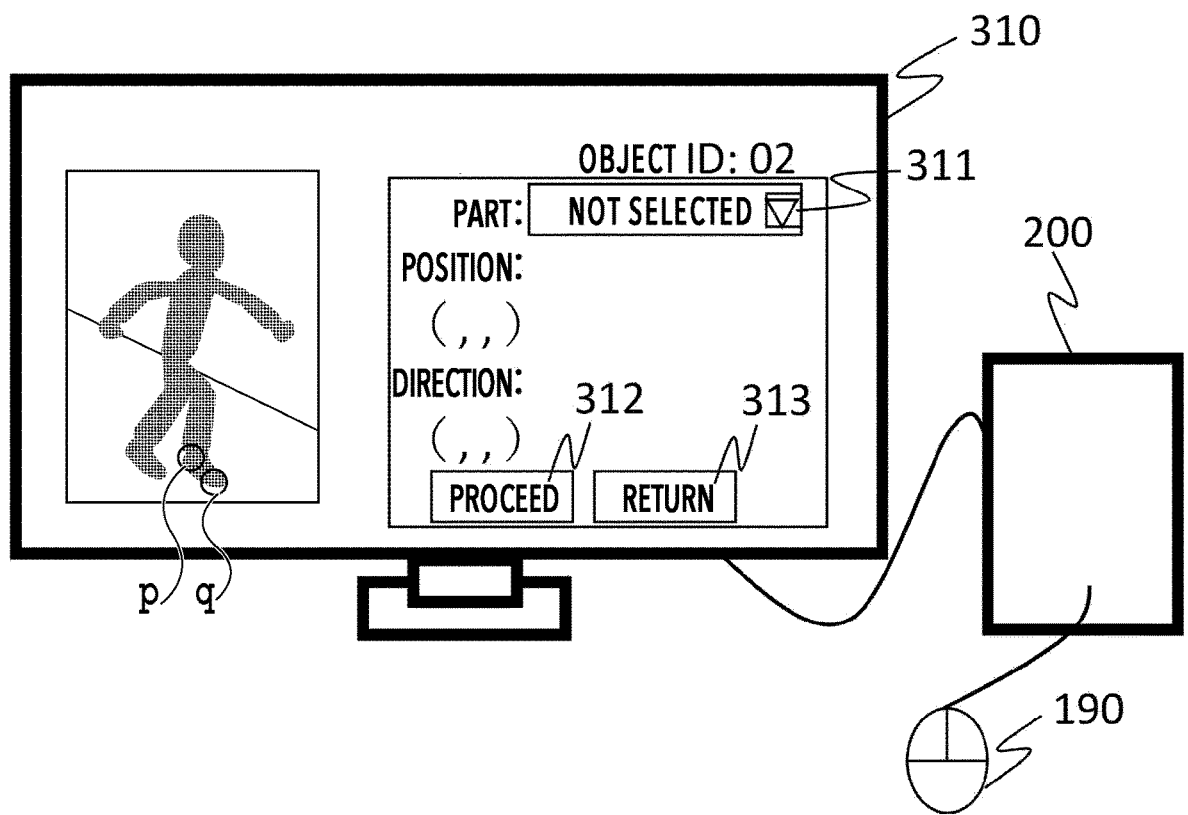
FIG. 16 is a view illustrating an example of a model part identification UI.

FIG. 16 is a view illustrating an example of the model part identification UI. FIG. 16 illustrates an example in which the part designating controller 190 is connected to the information processing apparatus 200 and the information processing apparatus 200 and the second display device 310 are connected to each other. Moreover, FIG. 16 illustrates a model part identification UI screen displayed on the second display device 310. The model part identification UI screen includes a region displaying the image of the three-dimensional model of the object and a reception region for receiving designation from the user.

In S1503, the model part identifying unit 230 identifies the model parts by using the designation instructions made by the user through the model part identification UI screen. The user designates each part in the following steps while viewing the model part identification UI screen. First, the user clicks a pull-down button 311 and selects part "right foot." Next, the user drags the pointer from a start point to an end point of a part (range of the part) which the user recognizes as "right foot." In this example, the user drags the pointer from a point p to a point q. The points p and q are three-dimensional points on the object. The model part identifying unit 230 selects a predetermined number of points, for example, 1000 points adjacent to the designated point p in a chain form and determines the points as the part 02-02. Moreover, the model part identifying unit 230 derives a vector extending from the point p to the point q as the direction 02-02v of the selected part "right foot." The user performs the aforementioned work for all parts while selecting the parts and finally clicks a "proceed" or "return" button to switch the object. Repeating the aforementioned work for all parts of all objects allows the model part identifying unit 230 to identify the parts.

Moreover, the model part identifying unit 230 in the embodiment performs tracking by deriving the center of gravity of each object and associating the objects in the time direction such that the distance from the derived center of gravity to the center of gravity of the object at the previous or next time point is minimized. Moreover, the model part identifying unit 230 tracks the parts by aligning the three-dimensional model with the three-dimensional model of the previous or next time point by using an interative closest point (ICP) algorithm and associating the parts with one another. Furthermore, the model part identifying unit 230 also tracks points p and q by using the ICP. Thus, by manually designating the parts only at a certain time clock, the user can cause the model part identifying unit 230 to track and automatically designate the parts and the directions of parts at other time points.

Specifically, in the embodiment, although the user manually performs the operation of designating the parts of the objects, this designation needs to performed once in the predetermined period being the target of analysis. Specifically, the user does not have to perform the operation of designating the parts of the objects at each time point. Since processing of S1504 to S1507 is the same as the processing of S904 to S907 described in Embodiment 2, the description there of is omitted.

As described above, in the embodiment, generating the model part identification UI and causing the user to identify the parts allows the identification of the model parts to be performed without using the learning data. Moreover, since the user does not have to designate the parts at each time point, cumbersome work by the user can be also reduced.

OTHER EMBODIMENTS

Although the contact portions between the players and the ground surface are analyzed in Embodiment 1 or 2, contacts between other three-dimensional models can be also analyzed. For example, in the case where the ball comes into contact with any of the shoulders, the right elbow, the left elbow, the right hand, and the left hand, this contact may be recognized as penalty to be stored and superimposed on the virtual viewpoint image. Specifically, contact portions between the foreground objects may be analyzed. It is only necessary that the contact portion between the three-dimensional model of the contacting target and the three-dimensional model of the contacted target can be analyzed. Moreover, the contact portions between players may be analyzed. In this case, there may be employed a mode in which parts of a player A and a player B are identified and parts coming into contact are identified through analysis. Furthermore, speed may be derived from the stride length and a time interval to be stored and displayed.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

According to the present disclosure, usability of analysis on the objects can be improved.

This application claims the benefit of Japanese Patent Application No. 2019-110204, filed Jun. 13, 2019, which is hereby incorporated by reference wherein in its entirety.

What is claimed is:
1. An information processing apparatus comprising:
at least one processor or circuit configured to:
obtain a first three-dimensional model expressing a shape of a first object in a three-dimensional space based on images of the first object captured by a plurality of image-capturing devices at different locations;
obtain a position of the first object in the three-dimensional space;
obtain a second three-dimensional model expressing a shape of a second object in the three-dimensional space;
obtain a position of the second object in the three-dimensional space;
identify a plurality of parts of the first object;
determine a contact between a certain part of the first object and the second object based on the obtained first three-dimensional model, the obtained second three-dimensional model, and an identification result of the plurality of parts;

output information according to a determination result of the contact; and generate a virtual viewpoint image according to a position and a direction of a designated virtual viewpoint, based on the obtained first three-dimensional model and the obtained second three-dimensional model, wherein the generated virtual viewpoint image and the output information are output to be displayed together on a display device, with the output information displayed superimposed on the virtual viewpoint image.

2. The information processing apparatus according to claim 1, wherein:

the at least one processor or circuit, in determining the contact, determines a plurality of contacts between the certain part of the first object and the second object in a period in which the plurality of image-capturing devices capture the images, based on a plurality of the first three-dimensional models respectively corresponding to a plurality of time points in the period, a plurality of the second three-dimensional models respectively corresponding to the plurality of time points, and the identification result of the plurality of parts, and the at least one processor or circuit, in outputting the output information, outputs the information based on at least one of a time relationship or a positional relationship between the plurality of determined contacts.

3. The information processing apparatus according to claim 1, wherein the at least one processor or circuit, in determining the contact between the certain part of the first object and the second object:

determines the contact between the first object and the second object based on the obtained first three-dimensional model and the obtained second three-dimensional model; and in a case where the contact between the first object and the second object is determined, identifies a part of the first object coming into contact with the second object among the plurality of parts of the first object.

4. The information processing apparatus according to claim 1, wherein the at least one processor or circuit, in determining the contact between the certain part of the first object and the second object:

identifies a part model of the first three-dimensional model corresponding to the identified certain part among the plurality of parts of the first object; and determines the contact between the identified part model of the first three-dimensional model and the second three-dimensional model.

5. The information processing apparatus according to claim 1, wherein the output information includes information indicating at least one of a position, a direction, or a time point of the contact.

6. The information processing apparatus according to claim 5, wherein the output information includes information indicating the certain part.

7. The information processing apparatus according to claim 1, wherein:

the first object is a person located within an image-capturing range of the plurality of image-capturing devices, and the second object is a ground surface.

8. The information processing apparatus according to claim 7, wherein the certain part is a foot of the person.

9. The information processing apparatus according to claim 8, wherein the output information includes at least one of information indicating a stride length of the person or information indicating a direction of the foot of the person on the ground surface.

10. The information processing apparatus according to claim 1, wherein the second object is a virtual flat plane set in the three-dimensional space.

11. The information processing apparatus according to claim 1, wherein the plurality of parts are identified based on results of machine learning on characteristics of the parts.

12. The information processing apparatus according to claim 1, wherein the plurality of parts are identified based on a user input made via a UI screen.

13. The information processing apparatus according to claim 1, wherein the output information is output to a display device.

14. An information processing method comprising:

obtaining a first three-dimensional model expressing a shape of a first object in a three-dimensional space based on images of the first object captured by a plurality of image-capturing devices at different locations;

obtaining a position of the first object in the three-dimensional space;

obtaining a second three-dimensional model expressing a shape of a second object in the three-dimensional space;

obtaining a position of the second object in the three-dimensional space;

identifying a plurality of parts of the first object;

determining a contact between a certain part of the first object and the second object based on the obtained first three-dimensional model, the obtained second three-dimensional model, and an identification result of the plurality of parts;

outputting information according to a determination result of the contact; and generating a virtual viewpoint image according to a position and a direction of a designated virtual viewpoint, based on the obtained first three-dimensional model and the obtained second three-dimensional model, wherein the generated virtual viewpoint image and the output information are output to be displayed together on a display device, with the output information displayed superimposed on the virtual viewpoint image.

15. The information processing method according to claim 14, wherein:

the determining of the contact determines a plurality of contacts between the certain part of the first object and the second object in a period in which the plurality of image-capturing devices captures the images, based on a plurality of the first three-dimensional models respectively corresponding to a plurality of time points in the period, a plurality of the second three-dimensional models respectively corresponding to the plurality of time points, and the identification result of the plurality of parts, and the outputting outputs the output information based on at least one of a time relationship or a positional relationship between the plurality of determined contacts.

16. A non-transitory computer readable storage medium storing a program executable by a computer to perform an information processing method comprising:

obtaining a first three-dimensional model expressing a shape of a first object in a three-dimensional space based on images of the first object captured by a plurality of image-capturing devices at different locations;

obtaining a position of the first object in the three-dimensional space;

obtaining a second three-dimensional model expressing a shape of a second object in the three-dimensional space;

obtaining a position of the second object in the three-dimensional space;

identifying a plurality of parts of the first object;

determining a contact between a certain part of the first object and the second object based on the obtained first three-dimensional model, the obtained second three-dimensional model, and an identification result of the plurality of parts;

outputting information according to a determination result of the contact; and generating a virtual viewpoint image according to a position and a direction of a designated virtual viewpoint, based on the obtained first three-dimensional model and the obtained second three-dimensional model, wherein the generated virtual viewpoint image and the output information are output to be displayed together on a display device, with the output information displayed superimposed on the virtual viewpoint image.

* * * * *